(12) United States Patent
Kanno et al.

(10) Patent No.: US 7,605,563 B2
(45) Date of Patent: Oct. 20, 2009

(54) CHARGING CIRCUIT AND CHARGER USING THE SAME

(75) Inventors: Masayoshi Kanno, Tokyo (JP);
Hiroyuki Mori, Kanagawa (JP);
Shinichiro Yamada, Kanagawa (JP);
Tsutomu Noguchi, Kanagawa (JP)

(73) Assignee: Sony Corporation (JP)

( * ) Notice: Subject to any disclaimer, the term of this patent is extended or adjusted under 35 U.S.C. 154(b) by 297 days.

(21) Appl. No.: 10/865,612

(22) Filed: Jun. 10, 2004

(65) Prior Publication Data

US 2004/0263125 A1 Dec. 30, 2004

(30) Foreign Application Priority Data

Jun. 17, 2003 (JP) .............................. P2003-172481

(51) Int. Cl.
*H02J 7/00* (2006.01)
*H02J 7/14* (2006.01)
(52) U.S. Cl. ..................... 320/123; 320/125; 320/137; 320/138
(58) Field of Classification Search .................. 320/114, 320/123, 125, 138, 140
See application file for complete search history.

(56) References Cited

U.S. PATENT DOCUMENTS 3,962,621 A * 6/1976 Raver .......................... 320/123

5,694,025 A * 12/1997 Oglesbee et al. ............. 320/137
6,462,507 B2 * 10/2002 Fisher, Jr. ...................... 320/101
2003/0042741 A1 * 3/2003 Hartman et al. .............. 290/1 C

FOREIGN PATENT DOCUMENTS

| JP | 55-092547 A | 7/1980 |
| JP | 9-331637 A | 12/1997 |
| JP | 10-210673 A | 8/1998 |
| JP | 11-185828 A | 7/1999 |
| JP | 2003-009596 A | 1/2003 |

OTHER PUBLICATIONS

Japanese Office Action issued on Jul. 7, 2008 in connection with Japanese Application No. 2003-172481 (3 pages).

* cited by examiner

*Primary Examiner*—Akm E Ullah
*Assistant Examiner*—Alexis Boateng
(74) *Attorney, Agent, or Firm*—Lerner, David, Littenberg, Krumholz & Mentlik, LLP

(57) ABSTRACT

A charging circuit includes a generator, a step-down circuit for reducing an output voltage of the generator to a predetermined voltage, a current controller for controlling a charging current that is supplied from the step-down circuit to a secondary battery, based on an amount of power generated by the generator, a mode selector for selecting charging modes, and a monitor for monitoring an amount of stored electricity. The step-down circuit receives an output of the generator, in charging, at a high voltage and a small current and is used to charge the battery at a low voltage and a large current.

10 Claims, 6 Drawing Sheets

CHARGING CIRCUIT AND CHARGER USING THE SAME

BACKGROUND OF THE INVENTION

1. Field of the Invention

The present invention relates to a charging circuit for efficiently charging a secondary battery with electricity of an output of a generator and a charger using this charging circuit. More specifically, it relates to a charging circuit etc. using a small-sized manpower generator.

2. Description of the Related Art

Recently, such a small-sized manpower generator has appeared which utilizes a motor to improve environment consciousness or accommodate shutoff of a battery of mobile appliances. It is commercially available as a charger combined with a radio or for use in charging of a cellular phone.

Such a charger is generally used for charging in a charging circuit shown in FIG. 1. In FIG. 1, a reference numeral 10 indicates a generator. In it, R indicates an internal resistor (output resistor) of the generator 10, r indicates a current limiting resistor, D indicates a backflow preventing diode, and B indicates a secondary battery. Further, Ke indicates a counter-electromotive voltage constant and $\omega$ indicates an angular velocity. Vo indicates a generated voltage and Vb indicates a voltage applied to the secondary battery B and the diode D.

In the case of a charger having a small-sized man power generator that utilizes a motor, its power generating capacity is determined mainly by specifications of a motor portion (generator 10). To increase the capacity, the electromotive voltage constant can be increased by increasing the number of turns of a coil wire. However, since in a case where a load is the secondary battery, an impedance at time when it is charged is small and cannot match an output impedance of the generator. As a result thereof, its power cannot be taken out effectively, so that it has been impossible to avoid a significant deterioration in efficiency only by increasing the number of turns.

If a charging current is large in a case where an output resistance of the generator 10 is large, this resistance component causes power proportional to a square of the current to be dissipated. On the other hand, power of electricity with which the secondary battery is charged is determined by a ratio between a terminal voltage and a charging current. The terminal voltage changes with the charging current but at a very small rate and so is roughly constant as shown in FIG. 2. This is because the impedance at time when the secondary battery is charged has a very small value of 1$\Omega$ or less.

FIG. 2 shows a relationship between a voltage of the secondary battery and a charging current when it is charged. As shown in FIG. 2, there is a linear relationship between the voltage of the secondary battery and the charging current. An equation of y=0.0004x+1.4051 is an approximate expression, which indicates the relationship between the voltage of the secondary battery and the charging current with which it is charged, and $R^2$ indicates a degree of approximation. In this case, a resistance value of a nickel-hydrogen battery (Ni-MH battery) used as the secondary battery is 0.4$\Omega$. In an actual circuit, to this resistance a resistance of the charging-current-limiting resistor and a resistance of the charging circuit are added, thus giving a total sum of about 1$\Omega$. It is generally known that when a load resistance and an output resistance are equal to each other, impedances match each other, in which case the load resistance has a maximum dissipation power, with efficiency of 50%. Therefore, in a case where the output resistance of the generator 10 is large, a loss increases as a charging current increases, thus deteriorating the efficiency.

FIG. 3 is a graph for showing relationships between a load resistance and each of the generated power, taken-out power, and charging current. Here, it is supposed that the generated power voltage of the generator 10 is 14V and its output resistance is 90$\Omega$. As shown in FIG. 3, to increase the current, the load resistance must be reduced to be small, in which case the power that can be taken out and the efficiency therefor are deteriorated greatly.

That is, to utilize generated power effectively, it is important to accomplish impedance matching, so that the number of turns of the coil wire is limited by a resistance component of the charging circuit including the battery. Conventionally, this problem has been coped with by first accomplishing impedance matching between the output resistor of the generator and the secondary battery and then increasing a revolution speed of the motor so that a larger amount of generated electricity may be generated. For example, to charge the nickel-hydrogen battery with electricity of a current of 0.5 A, the output voltage of the generator 10 is set to about 2.0V because a voltage at the battery terminal is 1.6V and Vf of the backflow preventing diode is 0.3V.

Therefore, according to this setting, the coil is wound so that the output resistance of the generator 10 may be 4$\Omega$ because of 2.0V/0.5 A, and then the revolution speed of the generator motor is so set higher as to permit the current of 0.5 A to flow therethrough. However, such the setting significantly suppresses a degree of freedom in design of the generator, so that it has been difficult to keep the revolution speed low for low-noise design while obtaining required power at the same time.

Further, in a commercially available generator, a charging current or a voltage of generated power has been detected and a light emitting diode (LED) has been used as a power generation monitor, thereby prompting a user to generate power in a set condition. This is because operating time of an appliance when it has been run at a prescriptive revolution speed of 120 rpm for one minute is defined as a power generating capacity of the appliance. Thus, the user has had to generate power while keeping in mind the prescriptive revolution speed and time in order to store the prescriptive power. This has burdened the user greatly.

From a viewpoint of environments it is important to utilize human energy effectively or, from a viewpoint of convenience of a mobile appliance, it is important to increase the operating time of the appliance for each unit of power generating time. That is, such a technology is necessary to acquire a required amount of generated electricity, at a smallest possible torque.

The amount of generated electricity can be obtained more by increasing the electromotive voltage constant of the generator, which means at the same time that the output resistance is increased. This leads to a need for a technology of efficiently taking out power to an outside even if the output resistance is large (e.g., in a case where a generator having a large internal resistance is utilized).

Further, a portable type manual charger has been proposed which has a constant voltage circuit for regulating a voltage generated by the generator to a constant value.

This portable type manual charger comprises a rotary manual handle, a generator for generating a voltage by rotating this handle, a constant voltage circuit for regulating a voltage generated by this generator to a constant value, an output terminal for charging a secondary battery with electricity of an output of this constant voltage circuit, and a detection circuit for detecting a predetermined value of voltage or current applied to the secondary battery to be charged, wherein the constant voltage circuit is constituted of a step-down type DC/DC converter.

Although this portable type manual charger has a simply-structure, and attains to low-cost one, a problem of a power loss due to the output resistance of the generator has not been solved. Further, it has been impossible to control a charging current based on an amount of generated electricity.

SUMMARY OF THE INVENTION

It is an object of the present invention to provide a charging circuit for efficiently charging a secondary battery with electricity of an output of a generator and a charger using this charging circuit.

According to the present invention, the foregoing object is attained by a charging circuit for charging a battery. The charging circuit comprises a generator for generating an output voltage, a step-down circuit for reducing the output voltage of the generator to a predetermined voltage, and a current controller for controlling a charging current, which is supplied from the step-down circuit to the battery, based on an amount of electricity generated by the generator. In charging circuit, the step-down circuit receives an output of the generator, in charging, at a high voltage and in a small current and is used to charge the battery at a low voltage and in a large current.

For example, this charging circuit further comprises a mode selector for selecting a mode for charging the battery, in which the mode includes a current-preferred mode for maximizing the charging current supplied to the battery and an efficiency-preferred mode for maximizing utilization of power taken out of the generator.

For example, further, in this charging circuit, the current controller comprises a current-controlling element and a current-limiting resistor which are set so that a total sum of a resistance component of the battery and a resistance of the current-limiting resistor may not be less than a negative resistance component of the current-controlling element. Further, a coil of the generator is supposed to have a delta connection.

For example, additionally, this charging circuit comprises a monitor circuit for monitoring an amount of stored electricity. The monitor circuit has a detector for detecting the amount of stored electricity by multiplying the charging current and a charging time.

In accordance with another aspect of the invention, a charger for charging a battery comprises a generator for generating an output voltage, a step-down circuit for reducing the output voltage of the generator to a predetermined voltage, and a current controller for controlling a charging current based on an amount of electricity generated by the generator, the charging current being supplied from the step-down circuit to the battery. In the charger, the step-down circuit receives an output of the generator, in charging, at a high voltage and in a small current and is used to charge the battery at a low voltage and in a large current.

For example, this charger further comprises a mode selector for selecting a mode for charging the battery, in which the mode includes a current-preferred mode for maximizing the charging current supplied to the battery and an efficiency-preferred mode for maximizing utilization of power taken out of the generator.

For example, further, in this charger, the current controller comprises a current controlling-element and a current-limiting resistor which are set so that a total sum of a resistance component of the battery and a resistance of the current-limiting resistor may not be less than a negative resistance component of the current-controlling element. Further, a coil of the generator is supposed to have the delta connection.

For example, additionally, this charger comprises a monitor circuit for monitoring an amount of stored electricity. The monitor circuit has a detector for detecting the amount of stored electricity by multiplying the charging current and a charging time.

According to the present invention, by providing the step-down circuit for reducing an output voltage of the generator to a predetermined voltage and the current controller for controlling a charging current, which is supplied to the battery, based on the electricity generated by the generator, the step-down circuit receives, in charging, an output of the generator at a high voltage and in a small current and is uses to charge the battery at a low voltage and in a large current. As a result thereof, impedance matching can be accomplished between the output resistor of the generator and the battery, thereby effectively taking power out of the generator and using it to charge the battery.

Therefore, a charging circuit including the battery can be constituted independently of the output resistance of the generator, thus greatly improving a degree of freedom in design. Even if the battery is charged using a low-revolution speed generator having a large electromotive voltage constant, good energy efficiency can be obtained, thereby conducting low-noise design for reducing a revolution speed.

Further, constant efficiency can be obtained even if a charging current is large, so that it is possible to avoid a running torque of a motor from increasing rapidly when an amount of generated electricity is increased, thereby obtaining good operationality.

Further, by selecting a mode for charging the battery, current-preferred charging or efficiency-preferred charging can be selected arbitrarily. Since the generator employs the delta connection, an output resistance of the generator can be lowered to improve efficiency of the step-down circuit. Further, since the monitor circuit for monitoring an amount of stored electricity is equipped, which detects and indicates that a constant level of power has been stored by generation, a user can store a prescriptive level of power by generating power at his or her desired revolution speed without knowing about a revolution speed in particular until it is indicated by the monitor.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

Figure 1:
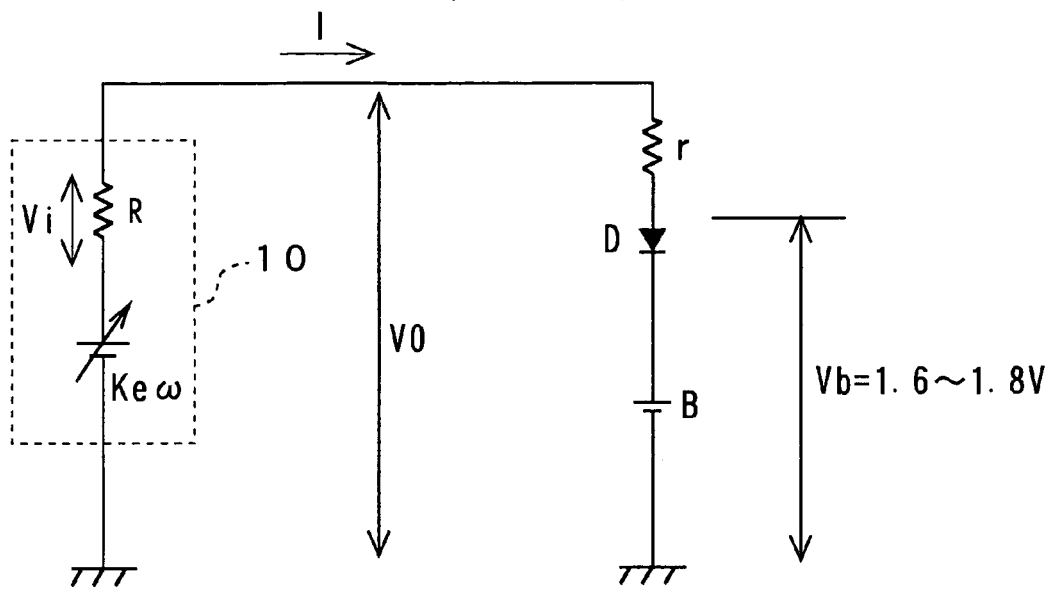
FIG. 1 is a diagram for showing a configuration of a direct charging circuit.
Figure 2:
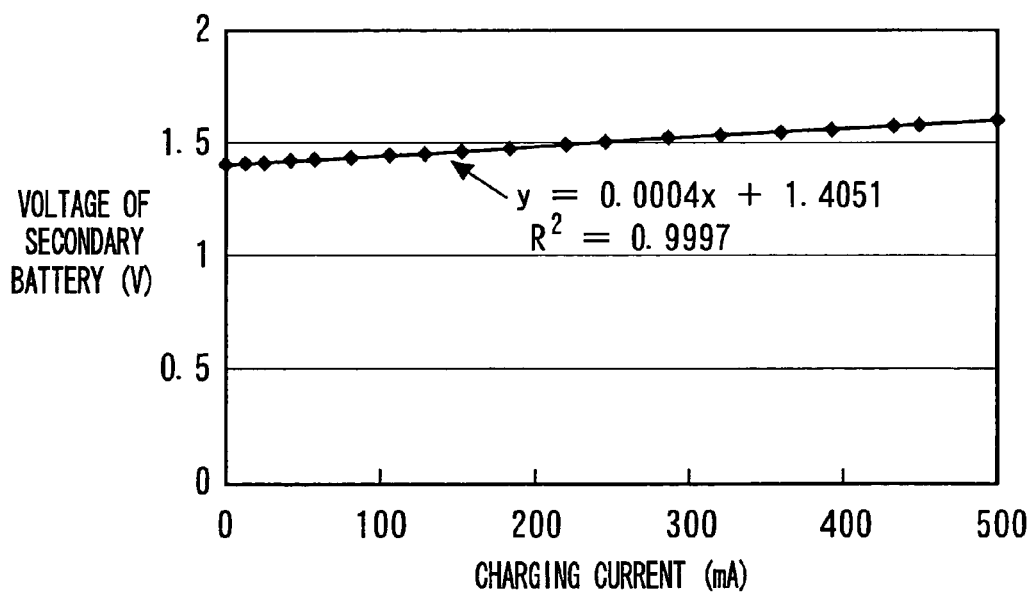
FIG. 2 is a graph showing a relationship between a voltage and a charging current of the secondary battery when it is charged.
Figure 3:
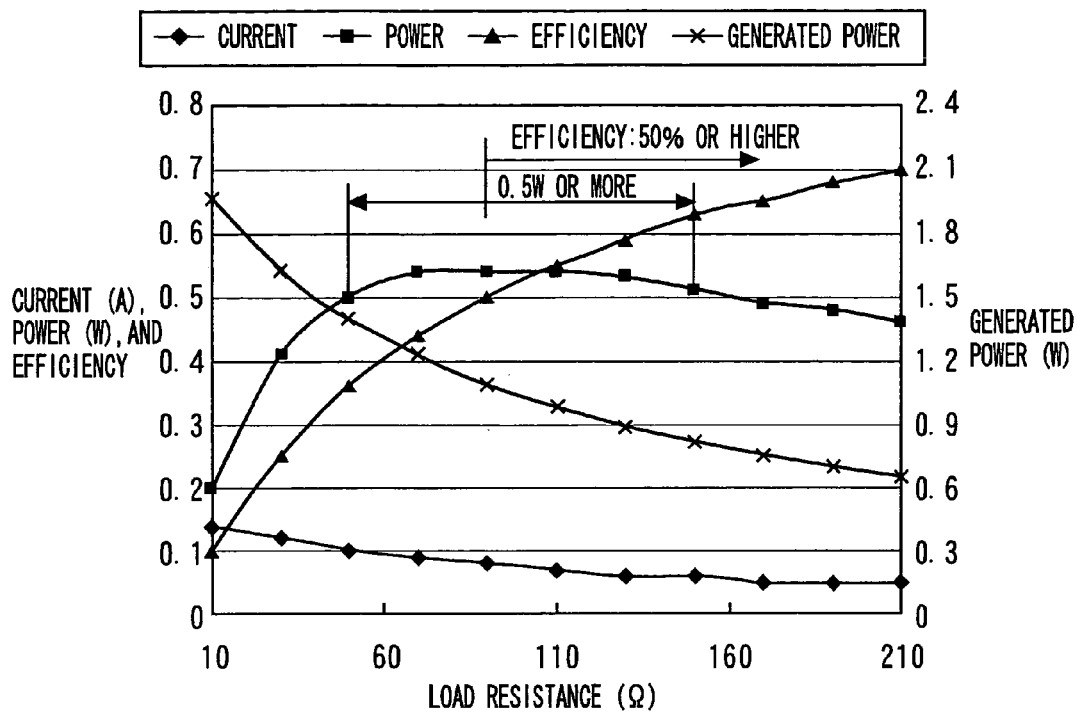
FIG. 3 is a graph for showing relationships between a load resistance and each of the generated power, taken-out power, and charging current.
Figure 4:
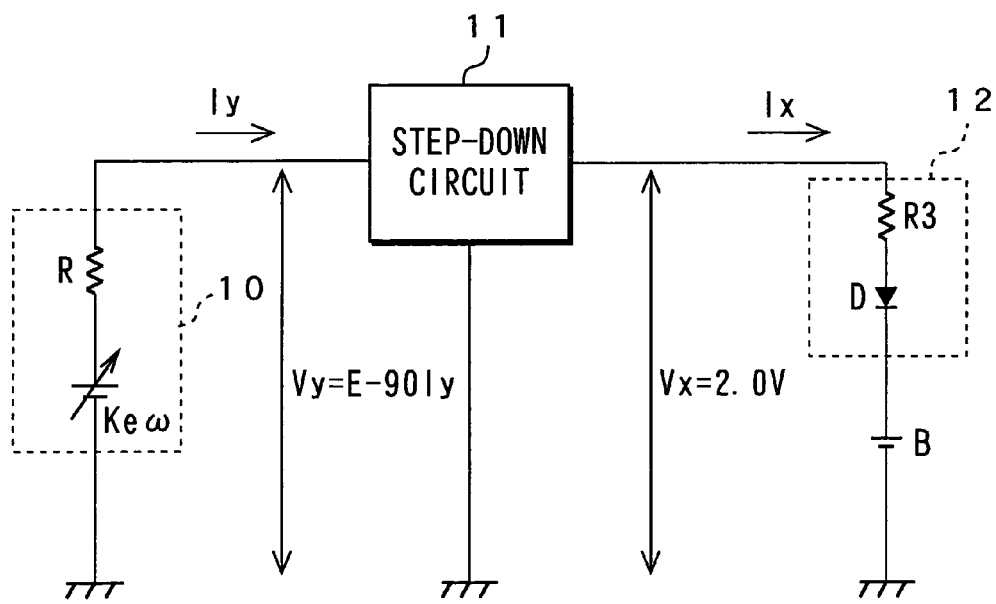
FIG. 4 is a block diagram for showing a configuration of an embodiment of a charging circuit according to the invention.
Figure 6:
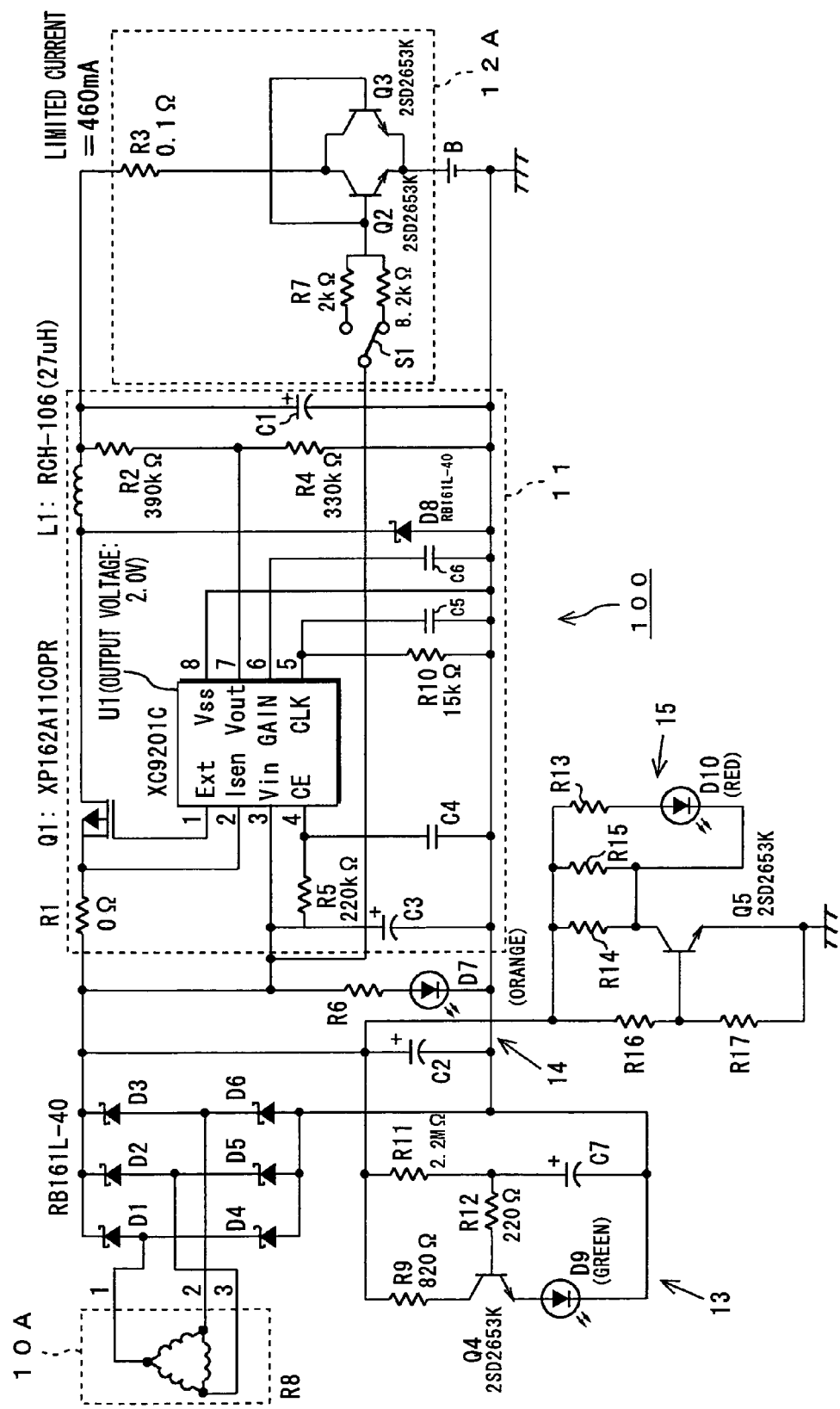
FIG. 6 is a circuit diagram for showing a configuration of an embodiment of a charger using the charging circuit according to the invention.

The following will describe embodiments of the present invention with reference to drawings. FIG. 4 is a block diagram for showing a configuration of an embodiment of a charging circuit 100 according to the invention. Further, FIG. 6 is a circuit diagram for showing a configuration of the charger 200 using the charging circuit 100.

As shown in FIG. 4, the charging circuit 100 comprises a generator 10, a step-down circuit 11, a current controller 12, and a secondary battery B.

The generator 10 has a rotary manual handle so that it may generate a voltage when this handle is rotated. For example, a three-phase brush-less motor is used. A coil of this generator 10 has a Y connection or delta ($\Delta$) connection.

The step-down circuit 11 has a step-down type DC-DC converter. In charging, this step-down circuit 11 receives an output of the generator 10 at a high voltage and in a small current and is used to charge the secondary battery B at a low voltage and in a large current.

The current controller 12 controls a charging current based on an amount of electricity generated by the generator 10. Here, to explain a charging system by use of the step-down circuit 11, the current controller 12 is supposed to comprise a current-limiting resistor R3 and a backflow preventing diode D. In this case, when charging the battery using the generator 10 as a charging power supply, a charging current is regulated to a predetermined value by the resistor R3. Further, the diode D is adapted to prevent the charging current from flowing back to the step-down circuit 11 from the secondary battery B during charging.

As the secondary battery B, an AA nickel-hydrogen battery is used for example. A voltage at an open terminal of this secondary battery B is, for example, 1.2V. It is to be noted that the secondary battery B may be comprised of a plurality of secondary batteries connected in parallel.

In FIG. 4, R indicates an internal resistance (output resistance) of the generator 10 and is supposed to be equal to 90Ω. Further, Ke indicates a counter-electromotive voltage constant and ω indicates an angular velocity. Vy indicates a generated voltage and Vx indicates an output voltage of the step-down circuit 11. Further, Iy indicates an output current of the generator 10 and Ix indicates an output current of the step-down circuit 11, that is, a charging current. It is to be noted that $E=Ke\omega$ wherein E indicates generated power voltage.

In the charging system by use of the step-down circuit shown in FIG. 4, the generator 10 is supposed to be equivalent to a battery having an output resistance of 90Ω and an output of the generator 10 is applied to the step-down circuit 11 having conversion efficiency of 80%. An output voltage of the step-down circuit 11 is supposed to be 2.0V. Under these conditions, the input applied to the step-down circuit 11 is given by the following Equation (1):

$$Vy = E - 90 \times Iy \quad (1)$$

Since the step-down circuit 11 has the same input and output, the following Equation (2) is obtained:

$$2.0 \times Ix = Vy \times Iy \times 0.8 \quad (2)$$

Equations (1) and (2) are combined to give the following Equation (3):

$$90 \times Iy^2 - E \times Iy + 2.5 \times Ix = 0 \quad (3)$$

From Equation (3), Iy can be obtained as follows:

$$Iy = \{E \pm \sqrt{(E^2 - 4 \times 90 \times 2.5 \times Ix)}\}/2 \times 90 \quad (4)$$

It can be seen that, for a content under the root sign in Equation (4) to have a solution, the generated power voltage E must have at least a certain value, which is determined by an output resistance, conversion efficiency, and a charging current. If the content under the root sign is 0, the output current Iy of the generator takes on a value obtained by dividing E by twice the output resistance (which current is received through a load resistance which is the same as the output resistance), thus meeting conditions for obtaining maximum power always irrespective of the conversion efficiency and the charging current. It is to be noted that if Ix=100 mA, E≧9.5V. Further, if E=9.5V, Vy=4.25V and Iy=53 mA.

Figure 5:
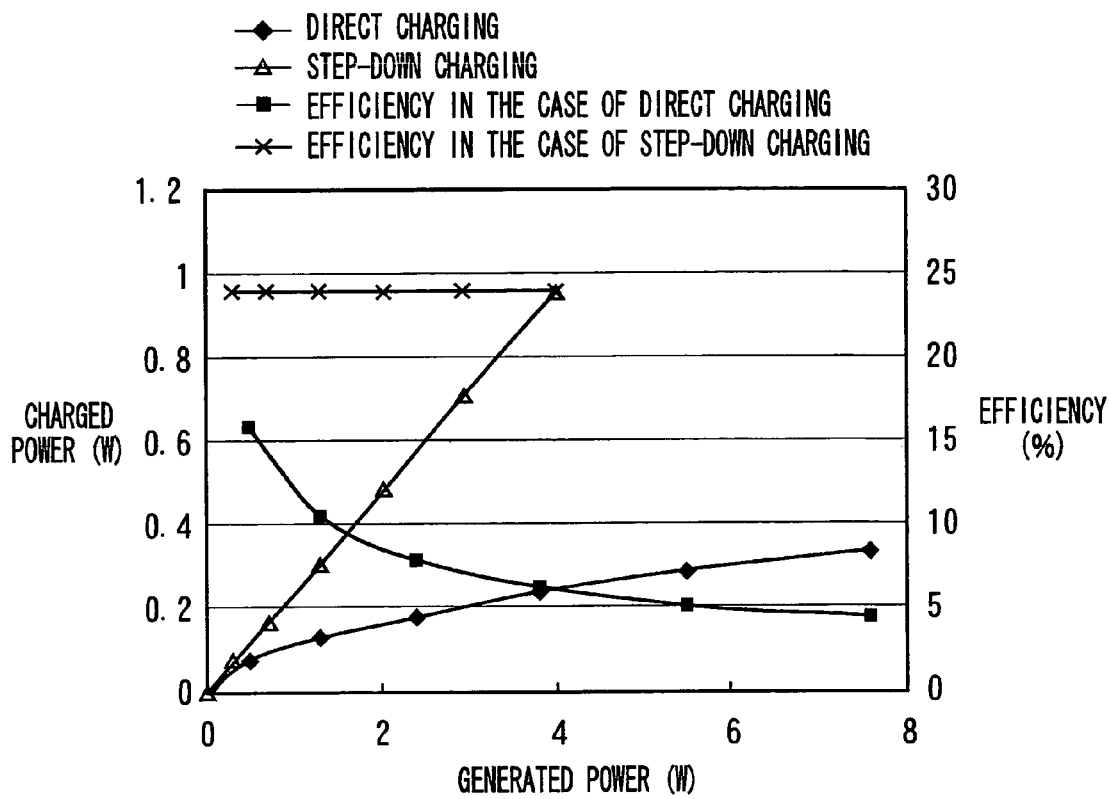
FIG. 5 is a graph for showing an example of comparison between direct charging and high-voltage charging.

FIG. 5 shows a result of calculations performed in a case where the secondary battery was charged directly and a case where it was done so through the step-down circuit. The battery was charged under the conditions that the output resistance of the generator 10 is 90Ω, the efficiency of the step-down circuit 11 is 0.8, and the output voltage of the step-down circuit 11 is 2.0V, and it was supposed that maximum power conditions are met.

As shown in FIG. 5, in the case of direct charging, as generated power increases, the efficiency is deteriorated. In the case where it is charged using the step-down circuit 11, on the other hand, the efficiency is high and constant. As the generated power increases, a difference between these cases becomes remarkable, so that the efficiency of charging becomes constant when the step-down circuit 11 is used, thus indicating that the step-down circuit 11 is effective.

With reference to FIG. 6, the following will describe a specific configuration of the charging circuit 100 used in an embodiment of a charger 200 according to the invention. As shown in FIG. 6, the charging circuit 100 comprises a generator 10A, the step-down circuit 11, current controller 12A, the secondary battery B, a monitor circuit 13 for monitoring an amount of stored electricity, a power generation monitor 14, and an over-voltage monitor 15. Of these, the current controller 12A comprises the current-limiting resistor R3 and transistors (current-controlling transistors) Q2 and Q3.

The generator 10A is supposed to be a three-phase brush-less motor and a coil of this generator 10 employs the delta ($\Delta$) connection. Therefore, an internal resistance of the generator 10A is reduced to, for example, 21Ω. By thus reducing the internal resistance, the efficiency of the step-down circuit 11 can be improved.

As the step-down circuit 11, a step-down type DC-DC converter having an output voltage of 2V (XC9201C type step-down IC, which is hereinafter referred to as "step-down IC") is used. It is to be noted that an over-current protection terminal 2 (second pin) of the step-down IC (U1) is not in use. Therefore, a resistance value of a resistor R1 is supposed to be 0.

The current controller 12A controls a charging current supplied to the secondary battery B using the current-limiting resistor R3 and the transistors Q2 and Q3 based on an amount of electricity generated by the generator 10A.

Further, the monitor circuit 13 comprises R11 and C7 shown in FIG. 6, to monitor an amount of the stored electricity. In this monitor circuit 13, an LED is adapted to emit light by using a timer constituted of R11 and C7 when a quantity of a current multiplied by a certain lapse of time is reached. In this case, the amount of the stored electricity is detected by multiplying the charging current by the charging time. For example, the charging current is monitored on the basis of a voltage applied to the step-down circuit 11 or an average value of pulses of a switching element driver.

This monitor circuit 13 turns on a green LED D9 when an amount of electricity of 400 mA multiplied by one minute is stored. In this circuit, D9 lights up when generation at 400 mA for one minute is performed. If generation at 200 mA for two minutes is performed, the LED D9 also lights up.

Further, the power generation monitor 14 is a circuit that includes resistance R6 and an orange-color LED D7. In it, a current starts to flow when a generated voltage reaches 2V or higher, while the step-down IC (U1) requires at least 2.3V for its stable operation. At this voltage, the orange-color LED D7 in the power generation monitor 14 lights up in setting. A user can charge the battery securely by rotating the handle so that the LED D7 may light up. A luminosity of the LED D7 depends on a generated voltage.

The over-voltage monitor 15 turns on a red LED D10 if excess power is generated, for example, if a generated voltage reaches 16.5V or higher. A protection current flows through Q5 if a voltage applied to the step-down IC (U1) reaches 16.5V or higher, to prevent an excessive voltage from being applied to it because the revolution speed is too high. In such a case, the red LED D10 emits light to give a warning to the user.

In charging, power generated by the generator 10A goes through a rectifier circuit constituted of diodes D1-D6 to be converted into a DC voltage and then is provided to a step-down circuit 11 having the step-down IC (U1). A switching frequency is determined to about 300 klHz by a resistor R10 and a capacitor C5 which are connected to a fifth pin of the step-down IC (U1). At this frequency, the switching element Q1 is switched, so that an output is provided through a coil L1. Its output voltage is returned to a seventh pin of the step-down IC (U1) by the feedback resistors R2 and R4 and compared with an internal reference voltage of 0.9V. An error voltage obtained after this comparison with the reference voltage undergoes pulse width modulation to be returned to a switching pulse and is controlled by changing its pulse duty ratio so that the output voltage may be kept constant.

An output of the step-down IC (U1) is applied to the secondary battery B through the current limiting resistor R3 and the transistors Q2 and Q3. These two transistors having a low Vce (sat) value were selected and used to reduce a circuit loss.

Since an output voltage of the step-down IC (U1) is constant at 2.0V, if current control is not conducted, a current flows irrespective of a generated power, so that a voltage applied to the step-down IC is lowered to a value below the one met the operating conditions of the step-down IC (U1) owing to a feedback in order of a charging current (large in magnitude), generator's output current (large in magnitude), and the voltage applied to the step-down IC (low in level). Therefore, there occurs a need for controlling the charging current in accordance with the generated power. The transistors Q2 and Q3 respectively control a base current based on the generated voltage so that the charging current may be altered.

A mode for charging the secondary battery B includes a current-preferred mode for regulating a charging current to be supplied to the secondary battery B to a predetermined value and an efficiency-preferred mode for maximizing utilization of power taken out of the generator 10A. This mode charge is controlled by altering a resistance value of a resistor R7. The resistance value of the resistor R7 is altered using, for example, a transfer switch S1 which functions as mode selector for selecting the mode for charging the secondary battery B.

If the resistance value of the resistor R7 is lowered by the transfer switch, the current-preferred mode is entered. In this case, a larger base current flows through each of the transistor Q2 and Q3 to increase the charging current. For example, if the current-preferred mode is entered in which the base resistance of R7 is switched to 2 kΩ to set the charging current to a maximum value (e.g., 900 mA), take-out efficiency of generated power is about 50%. If the resistance value of the resistor R7 is increased by the transfer switch, on the other hand, the efficiency-preferred mode is entered. In this case, a smaller base current flows through each of the transistors Q2 and Q3, so that the charging current decreases but the take-out efficiency increases. For example, in a case where such an efficiency-preferred mode is entered that the base resistance of R7 is switched to 8.2 kΩ to set the take-out efficiency of the generated power to a maximum value (e.g., 84%), the charging current is about 460 mA.

FIGS. 7 to 11 show results of experiments conducted in a case where in place of the generator 10A an output resistor (68Ω) was connected to the DC power supply in the above-mentioned charging circuit 100.

Figure 7:
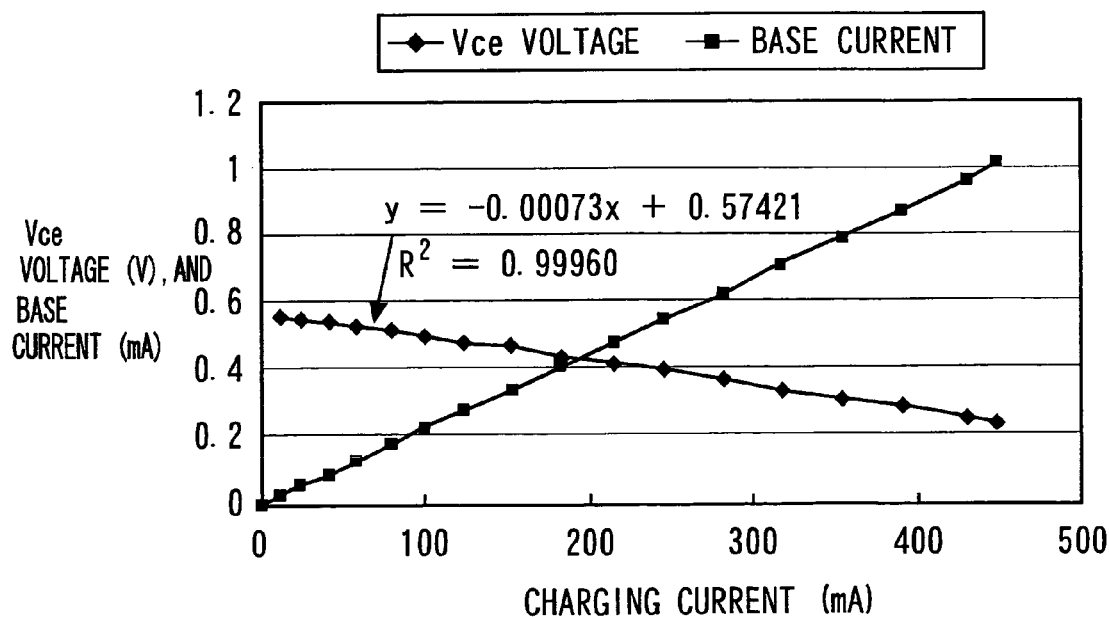
FIG. 7 is a graph for showing properties of a current-controlling transistor.

FIG. 7 shows properties of the current control transistor Q2 and Q3. It indicates a relationship between an actual charging current and each of the Vce voltage and base current of the control transistors Q2, Q3. An equation of $y=-0.00073x+0.57421$ in the graph is an approximate expression that indicates a relationship between a charging current and Vce voltage during charging, and $R^2$ therein indicates a degree of approximation.

As shown in FIG. 7, good linearity is maintained between the charging current and the Vce voltage and between the charging current and the base current. Further, in this example, Vce can be approximated by 0.57–0.73×current value (A) and a resistance component can be replaced by 0.73Ω with a negative polarity, that is, a negative resistance. In the charging circuit 100 shown in FIG. 6, this negative resistance (–0.73Ω) was canceled by the internal resistance of the secondary battery B of 0.4Ω and the current-limiting resistance R3 so as to provide 0Ω. This avoids the output of the step-down IC (U1) from being influenced by a magnitude of the charging current. If a current flows so that such a combined resistance is negative, a feedback occurs in a further-current-flow direction, thereby resulting in flowing an excessive current. If a current flows so that the combined resistance is positive, on the other hand, a feedback occurs in such a direction that the current flow may be suppressed, thereby enabling safe charging.

A maximum current is permitted to flow when a sufficient amount of electricity is generated and the Vce voltage of each of the transistors Q2 and Q3 is reduced to a minimum. The maximum current and is mainly regulated by the output voltage and the current-limiting resistance R3 to 1A or lower in this circuit.

Figure 8:
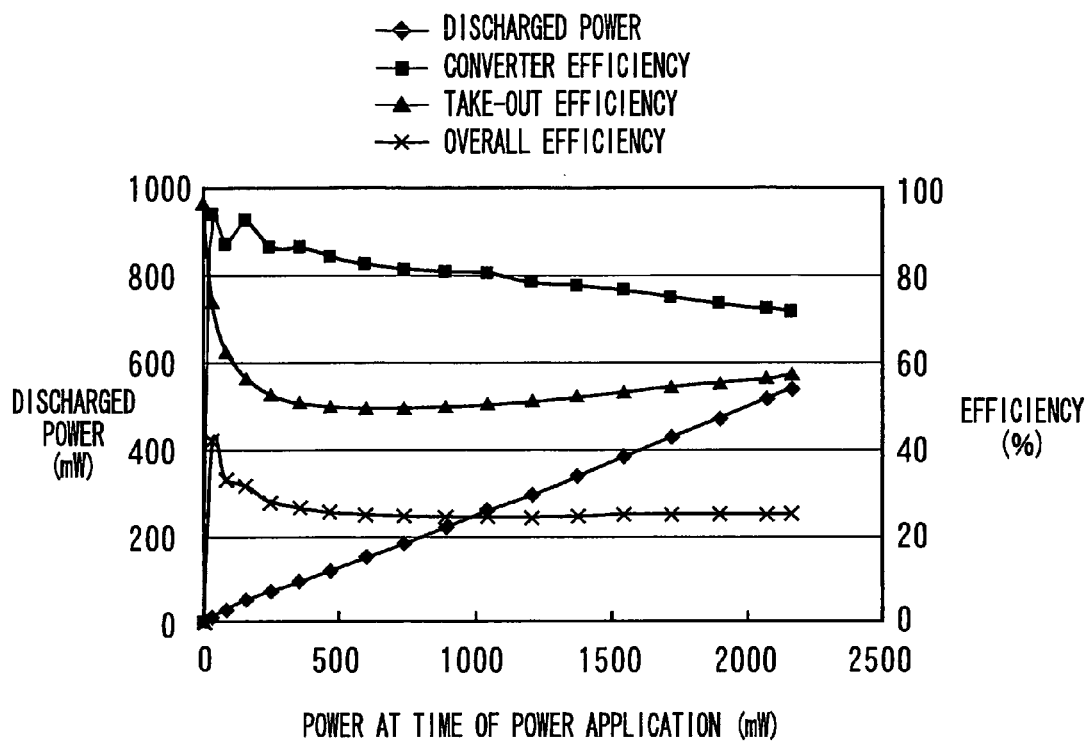
FIG. 8 is a graph for showing relationships between power at time of power application, and each of the discharged power and energy efficiency.

FIG. 8 is a graph for showing relationships between an amount of the generated electricity, and each of the amount of discharged electricity and energy efficiency. In FIG. 8, a horizontal axis representing power at time of power application indicates output power of the DC power supply used in place of the generator 10A. It is to be noted that the amount of discharged electricity (discharged power) was obtained by multiplying a charging current by 1.2V. Further, taking-out efficiency was defined by (1.2V/step-down circuit's output voltage) and overall efficiency, by (the amount of the discharged electricity/the amount of the generated electricity).

FIG. 8 shows that efficiency at which energy is taken out to an outside is 50-57%, which is a good value in the vicinity of a roughly maximum power value, and increases slightly as the discharged power increases in a region where the discharged power is at least 100 mW. The conversion efficiency of the step-down circuit deteriorates as a difference between input and output voltages increases and so decreases as the amount of the generated electricity increases. These two properties offset each other, so that the overall efficiency was a flat value of about 25%, exhibiting properties independent of the charging current (discharged power).

Figure 9:
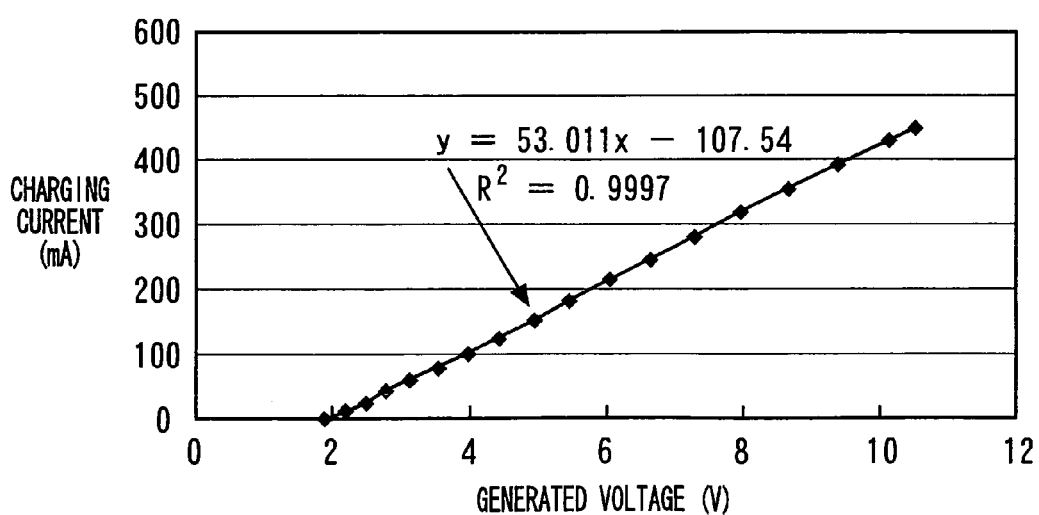
FIG. 9 is a graph for showing a relationship between a voltage of generated power and a charging current.

FIG. 9 is a graph for showing a relationship between a generated voltage and a charging current. An equation of y=53.011x−107.54 in the graph is an approximate expression that indicates a relationship between the generated voltage and the charging current, and $R^2$ therein indicates a degree of approximation.

FIG. 9 shows that good linearity is maintained between an output voltage of the generator 10A and a charging current. Therefore, it is possible to correctly detect an amount of the stored electricity even if the charging current has altered due to fluctuations in the generated voltage caused by fluctuations in revolution speed etc. A current starts to flow at 2V or higher because the step-down IC (U1) requires at least 2.3V for stable operation. It is so set that at this voltage the LED D7 in the power generation monitor 14 may emit light.

Figure 10:
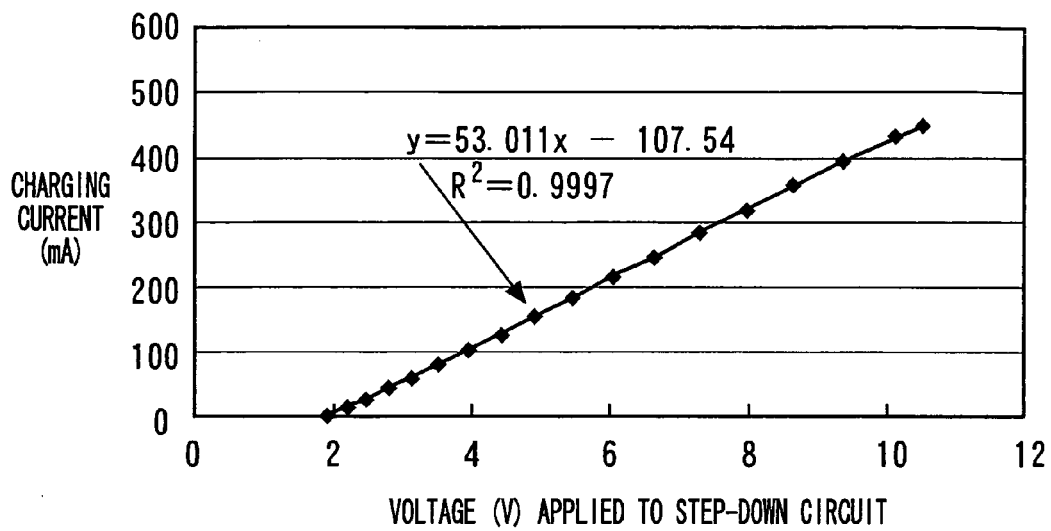
FIG. 10 is a graph for showing a relationship between a voltage applied to a step-down circuit and a charging current.

FIG. 10 is a graph for showing a relationship between a voltage applied to the step-down IC and a charging current. An equation of y=53.011x−107.54 in the graph is an approximate expression that indicates a relationship between the voltage applied to the step-down IC (U1) and the charging current, and $R^2$ therein indicates a degree of approximation. As shown in FIG. 10, good linearity is maintained between a voltage applied to the step-down IC (U1) and a charging current. When the applied voltage reaches 2V or higher, a current starts to flow, thereby causing the step-down IC (U1) to operate.

Figure 11:
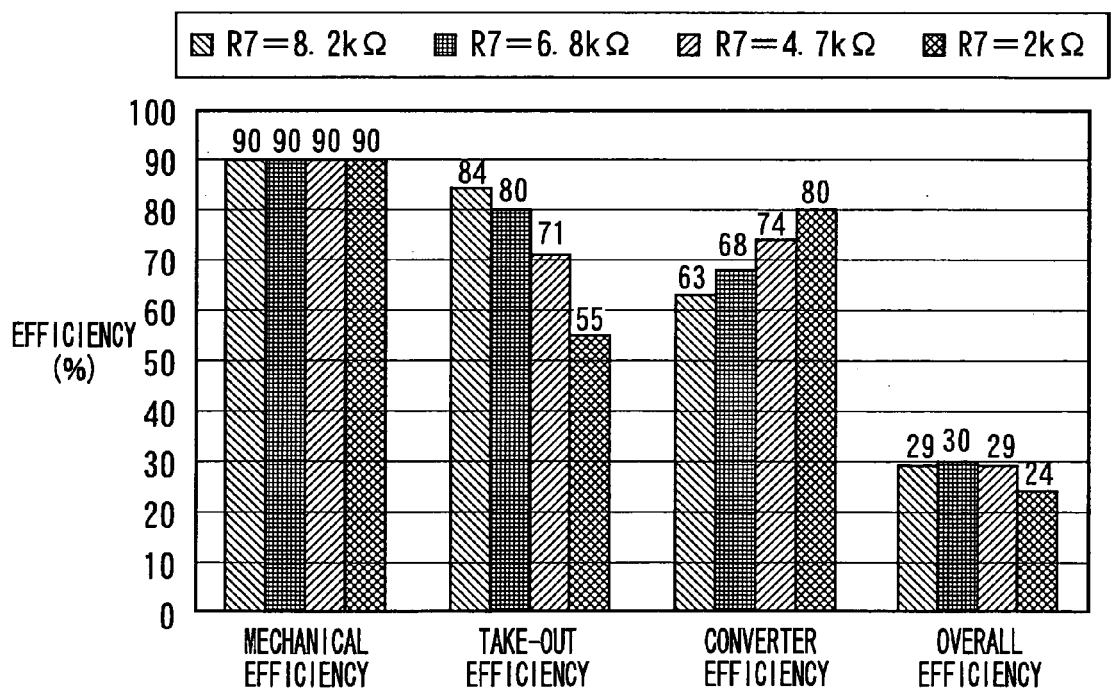
FIG. 11 is a graph for showing a relationship between a base resistance and efficiency.

FIG. 11 is a graph for showing a relationship between a base resistance and efficiency. In FIG. 11, efficiency values are those obtained in a case where generated power is 600 mW. Further, a mechanical loss (loss due to a gear portion) is an estimate and magneto-electric efficiency is 100%.

As shown in FIG. 11, mechanical efficiency is 90% irrespective of the resistance value of the base resistor R7. Further, take-out efficiency decreases as the resistance value of the base resistor R7 decreases. Further, converter efficiency increases as the resistance value of the base resistor R7 decreases. Further, when the resistance value of the base resistor R7 is 6.8 kΩ, 8.2Ω, or 4.7 kΩ, the overall efficiency is comparatively high and, when the resistance value of the resistor R7 is 2 kΩ, the overall efficiency is comparatively low. That is, the take-out efficiency and the converter efficiency cannot be consistent with each other. When the take-out efficiency is 50%, the charging current takes on a maximum value (e.g., 900 mA).

As mentioned above, by inserting the step-down circuit 11 (i.e., step-down type DC-DC converter) as an impedance conversion element between the output of the generator 10A and the secondary battery B, receiving power out of the generator at a high voltage and in a small current, and then using it to charge the secondary battery at a low voltage and in a large current, impedance matching can be accomplished to obtain high charging efficiency even if the output resistance becomes large.

As described above, according to the present embodiment, there are provided the step-down circuit 11 for reducing an output voltage of the generator 10A to a predetermined voltage, the current controller 12A for controlling a charging current supplied from the step-down circuit 11 to the secondary battery B based on an amount of electricity generated by the generator 10A, the mode selector (not shown) for selecting a charging mode, and the monitor circuit 13 for monitoring an amount of stored electricity. The step-down circuit 11 receives an output of the generator, in charging, at a high voltage and in a small current and is used to charge the secondary battery at a low voltage and in a large current. Thus, impedance matching can be accomplished between the output resistance of the generator 10A and the secondary battery B, thereby taking power out of the generator 10A effectively and using it to charge the secondary battery B.

Therefore, it is possible to constitute a charging circuit including the secondary battery B irrespective of the output resistance of the generator 10A, thereby greatly improving a degree of freedom in design. Good energy efficiency can be obtained even if the secondary battery B is charged using the low-revolution speed generator 10A having a large electromotive voltage constant, thereby conducting low-noise design for reducing a revolution speed.

Further, constant efficiency can be obtained even if a charging current is large, so that it is possible to avoid a running torque of the motor from increasing rapidly when an amount of generated electricity is increased, thereby obtaining good operationality.

Further, by selecting a mode for charging the secondary battery B, current-preferred charging or efficiency-preferred charging can be selected arbitrarily. Since the generator 10A employs the delta connection, the output resistance of the generator 10A can be lowered to improve the efficiency of the step-down circuit.

Further, the monitor circuit 13 for monitoring an amount of the stored electricity is equipped which causes a minute current proportional to a charging current to flow through a timer circuit constituted of a resistor and a capacitor by utilizing a relationship between the generated voltage and the charging current, to thereby always indicate that a constant level of power has been stored irrespective of a magnitude of a revolution speed of the generator. This permits a user to store a prescriptive level of power by generating power at his or her desired revolution speed without knowing about a revolution speed in particular until the monitor circuit 13 emits light.

The above-mentioned charging circuit 100 can be used to constitute a charger in which the generator 10A serves as a charging power supply. In this case, the generator 10A may be integrated with circuit portions such as the step-down circuit 11, the current controller 12A, and the monitor circuit 13 (for example, contained in the same casing) to thereby constitute the charger. Further, the secondary battery B is mounted detachably. It is to be noted that the generator 10A may be separated from the circuit portions such as the step-down circuit 11, the current controller 12A, and the monitor circuit 13.

Although the above embodiments have been described with reference to a case where the secondary battery B is a 1.5V nickel-hydrogen battery, the present invention is not limited to it. The present invention can be applied to any other kinds of batteries. Further, the present invention is applicable also to a case where a plurality of secondary batteries is used in series or parallel to constitute the secondary battery B to be charged. This modification can be accommodated by altering an output voltage or current of the step-down circuit 11. For example, if a plurality of secondary batteries is used in series, a step-down circuit having a higher output voltage can be used.

Although in the above embodiment the generator 10A has employed the delta connection, the present invention is not limited to it. The present invention can also be applied to a generator employing the Y connection.

Although in the above embodiment the generator 10 or 10A has used a hand-cranked motor, the present invention is not limited to it. Any other kinds of rotary generators, for example, a small-sized wind generator may be used.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A charging circuit for charging a battery, comprising:
   a generator operable to generate an output voltage;
   a step-down circuit operable to reduce the output voltage of said generator to a predetermined lower voltage;
   a current controller operable to control a charging current based on an amount of power generated by said generator, said charging current intended for supply from said step-down circuit to said battery, said current controller having a current-controlling element and a current-limiting resistor, in which said current-controlling element is a number of transistors; and
   a mode selector for selecting a charging mode from among a plurality of modes for charging said battery, said mode selector having a resistor and a switch coupled to the number of transistors of said current-controlling element so as to control a flow of base current therethrough, wherein said plurality of modes includes a current-preferred mode for maximizing the charging current supplied to said battery and an efficiency-preferred mode for maximizing utilization of the power taken out of said generator,
   wherein a total sum of a resistance component of said battery and a resistance of the current-limiting resistor is set to be not less than a negative resistance component of said current-controlling element.

2. The charging circuit according to claim 1, wherein a coil of said generator has a delta connection.

3. The charging circuit according to claim 1, wherein said step-down circuit is a step-down type DC-DC converter for regulating a voltage generated by said generator to a constant voltage.

4. The charging circuit according to claim 1, further comprising a monitor circuit for monitoring an amount of electricity stored in said battery, said monitor circuit having a detector for detecting the amount of stored electricity by multiplying the charging current and a charging time.

5. The charging circuit according to claim 4, wherein said monitor circuit monitors the charging current based on one of an input voltage applied to said step-down circuit and an average value of pulses of a switching element driver.

6. A charger for charging a battery, said charger comprising:
   a generator operable to generate an output voltage;
   a step-down circuit operable to reduce the output voltage of said generator to a predetermined lower voltage;
   a current controller operable to control a charging current based on an amount of power generated by said generator, said charging current intended for supply from said step-down circuit to said battery, said current controller having a current-controlling element and a current-limiting resistor, in which said current-controlling element is a number of transistors; and
   a mode selector for selecting a charging mode from among a plurality of modes for charging said battery, said mode selector having a resistor and a switch coupled to the number of transistors of said current-controlling element so as to control a flow of base current therethrough, wherein said plurality of modes includes a current-preferred mode for maximizing the charging current supplied to said battery and an efficiency-preferred mode for maximizing utilization of the power taken out of said generator,
   wherein a total sum of a resistance component of said battery and a resistance of said current-limiting resistor is set to be not less than a negative resistance component of said current-controlling element.

7. The charger according to claim 6, wherein a coil of said generator has a delta connection.

8. The charger according to claim 6, wherein said step-down circuit is a step-down type DC-DC converter for regulating a voltage generated by said generator to a constant voltage.

9. The charger according to claim 6, further comprising a monitor circuit for monitoring an amount of electricity stored in said battery, said monitor circuit having a detector for detecting the amount of stored electricity by multiplying the charging current and a charging time.

10. The charger according to claim 9, wherein said monitor circuit monitors the charging current based on one of an input voltage applied to said step-down circuit and an average value of pulses of a switching element driver.

* * * * *